United States Patent

[11] 3,572,787

| [72] | Inventors | Gerald L. Timmerman;<br>Paul S. Timmerman, 5500 4th Ave South,<br>Seattle, Wash. 98108 |
|---|---|---|
| [21] | Appl. No. | 864,703 |
| [22] | Filed | Oct. 8, 1969 |
| [45] | Patented | Mar. 30, 1971 |

[54] KNOCKDOWN JOINT CONSTRUCTION FOR FURNITURE FRAMES AND OTHER STRUCTURES
15 Claims, 8 Drawing Figs.

[52] U.S. Cl. ........................................... 287/189.36,
108/156, 297/440, 248/188
[51] Int. Cl. ........................................... F16b 7/00
[50] Field of Search ........................................... 287/189.36
(H), 189.36 (F), 20.92 (C), 54 (A), 54 (C);
108/153, 156, 111, 106; 297/440; 248/188;
312/(Inquired); 211/177, 182, 148

[56] References Cited
UNITED STATES PATENTS

| 3,065,860 | 11/1962 | Swanson | 108/106X |
|---|---|---|---|
| 3,216,752 | 11/1965 | Rifken | 211/182X |
| 3,327,658 | 6/1967 | Schreyer | 108/156 |
| 3,353,854 | 11/1967 | Hansen | 287/189.36F |
| 3,409,258 | 11/1968 | Carlson | 108/156X |
| 3,420,484 | 1/1969 | Mattick | 108/156X |

FOREIGN PATENTS

| 744,357 | 1/1944 | Germany | 287/189.36H |
|---|---|---|---|
| 180,343 | 8/1962 | Switzerland | 287/54A |

*Primary Examiner*—Thomas F. Callaghan
*Assistant Examiner*—Wayne L. Shedd
*Attorney*—Graybeal, Cole & Barnard

ABSTRACT: Joint construction in which individual corner members such as table legs are provided with sleeve guide extensions to receive tubular connecting apron or frame members. A bolt extends inwardly from the leg between the sleeve guides and receives a retainer member which engages the apron members to hold the apron members firmly in position on the sleeve guides and against the leg. A locking means holds the retainer in place. Panels or surfaces can then be connected to the apron or frame members.

PATENTED MAR 30 1971

INVENTOR.
GERALD L. TIMMERMAN
PAUL S. TIMMERMAN
BY
Graybeal, Cole & Barnard
ATTORNEYS

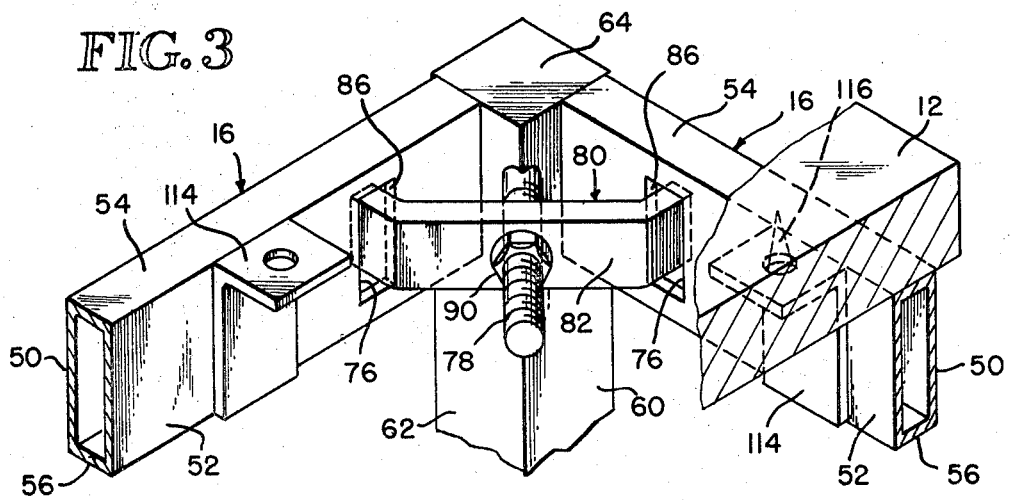
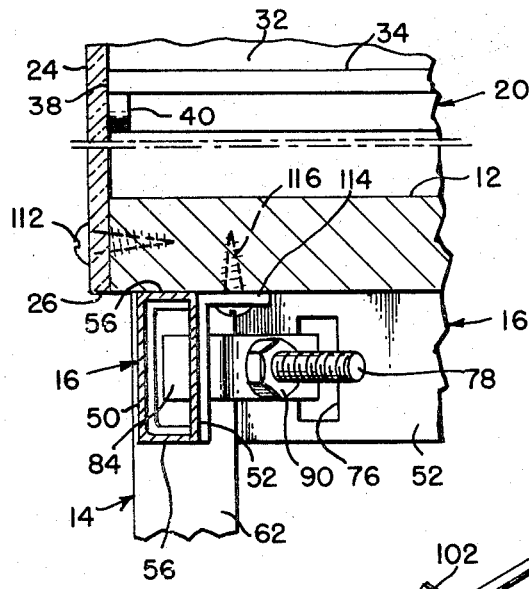
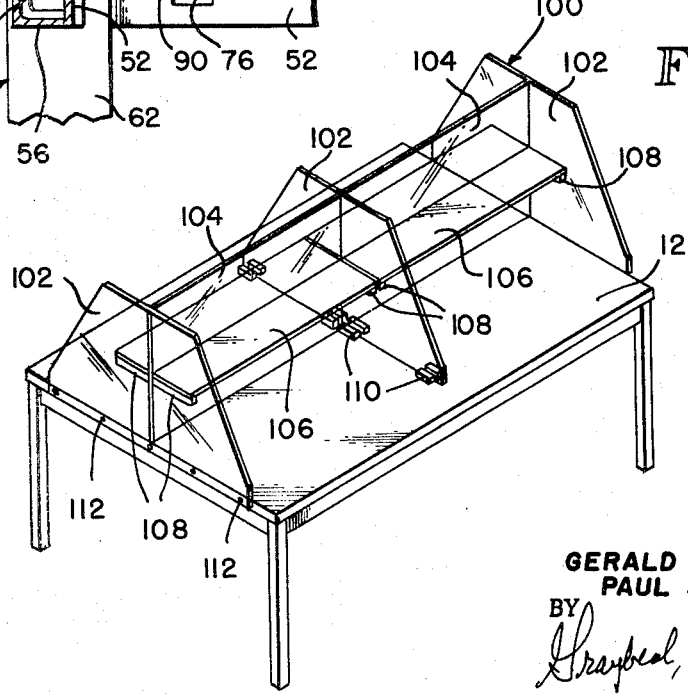

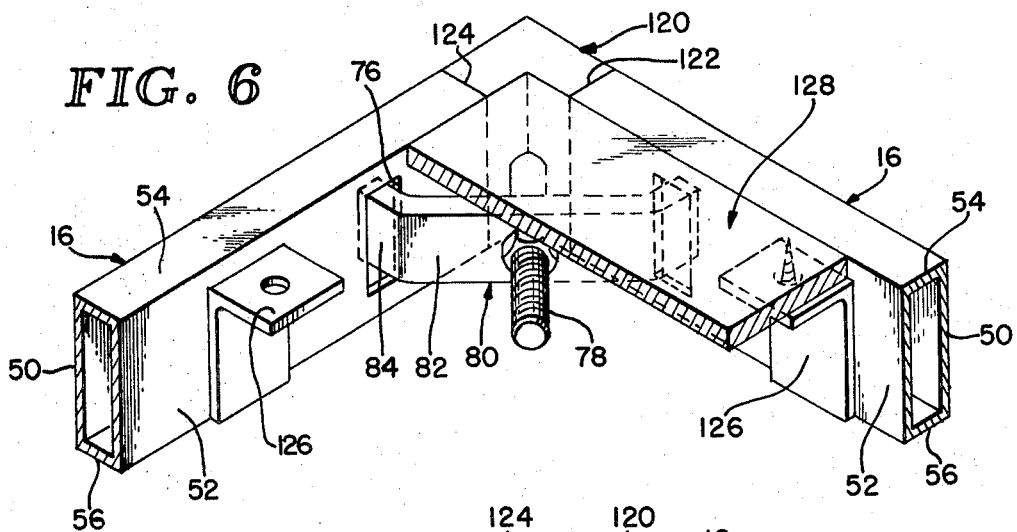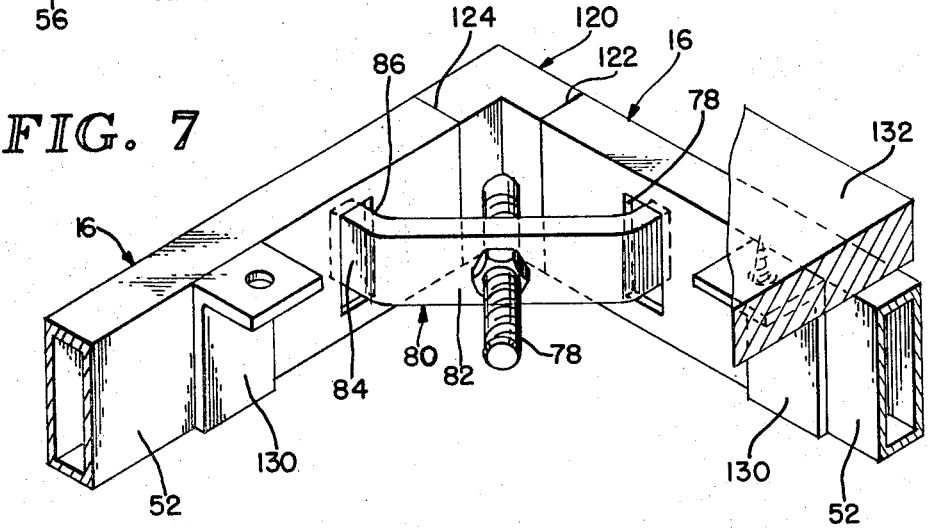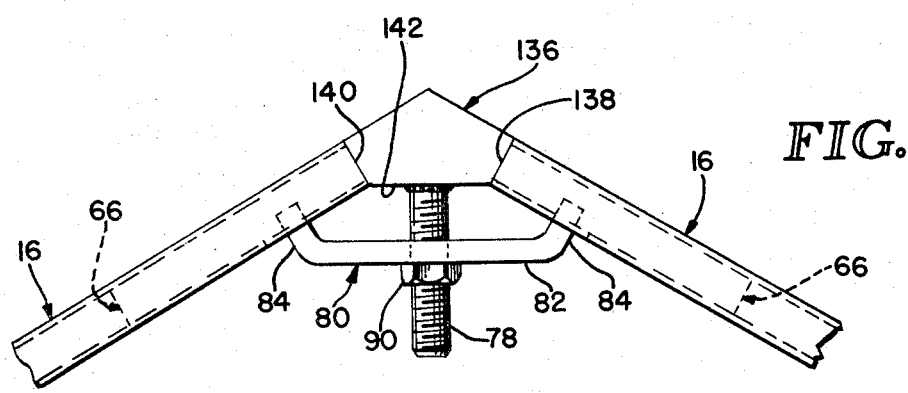

KNOCKDOWN JOINT CONSTRUCTION FOR FURNITURE FRAMES AND OTHER STRUCTURES

BACKGROUND OF THE INVENTION

It is desirable in furniture such as tables that the legs be as near the corner of the top as possible to maximize space between the legs to accommodate chairs. However, it has been found in heretofore known knockdown tables, desks and the like that the apron members sag or deflect under the weight of the top and allow the legs or corner supports to splay. It is particularly significant that known knockdown corner or joint structures are unsteady because they lack rigidity. No table, for instance, includes an apron leg joint which is strong enough to permit location of the legs at the corners with little or no overhang and still preserve rigidity.

SUMMARY OF THE INVENTION

The invention is directed to a demountable or knockdown joint structure in which the corner pieces are provided with sleeve guide extensions projecting outwardly at an angle to each other to receive the main horizontal frame or apron members extending between the corner members. The sleeve guide extensions in this instance are short channel members rigidly connected to the corner members. The aprons or frame members preferably are box beam or rectangular tube configuration and received on the extension guides. The apron or frame members on the inside of the defined angle will be provided with an engaging surface such as an opening on the inside wall. A bolt, threaded member or other retainer mount is secured to the corner piece and extends outwardly between the extension guides. A retainer member slides onto the bolt and engages the engaging surface in the apron members. A bolt locks the retainer, extension guides, and apron members into a rigid assembly. Brackets may be mounted on the apron members to which will be connected a surface, panel, or top.

Accordingly, it is among the features of this invention to provide a joint construction which allows an article to be manufactured and shipped in its knocked down state and rapidly assembled at its destination. It is a further feature that the structure such as an item of furniture can be assembled and disassembled with a minimum amount of inconvenience and a minimum amount of time. The joint construction is extremely rigid when assembled, providing a steady, firm frame or structural unit. The apron or frame members abut directly against the corner piece and are securely held, thus assisting in the rigid construction. The tubular frame members themselves, being of heavy gauge metal construction, will not sag, deflect, or buckle. It is another feature that the construction does not require a plurality of screws or bolt type fasteners or other semipermanent fastening means at each joint and between the adjacent units or components. It is still another feature to provide a joint construction which involves relatively few parts and thus is simple but unique and economical to manufacture. The joint is light in weight and of little bulk when disassembled and therefore results in minimum packing, storage and shipping costs. The table requires no particular skill to assemble or to disassemble. The joint construction of this invention will have application not only to tables and desks but also to all kinds of drawing tables, lounge furniture and sofa frames, shelving frames, warehouse pallet racks, suspended ceilings, walkways, sundecks, flooring frames, prefab buildings; interior partitions, bed frames, concrete forms, scaffolding, door frames and window frames.

BRIEF DESCRIPTION OF DRAWINGS

FIG. 3 shows a perspective view of the joint construction fully assembled and in its locked position and further illustrating how a surface may be connected;

FIG. 4 is a partial elevational view in cross section showing additional details of construction and including the details of a study carrel as mounted on a table surface;

FIG. 5 is a perspective view showing a multiple study carrel construction on a table utilizing the joint construction of this invention;

FIG. 6 is a partial perspective view showing slight alternative details of construction in the joint and how a flush panel may be mounted thereon; FIG. 7 is a partial perspective view showing essentially the joint of FIG. 6 and showing that a panel can be mounted similar to a table or countertop to cover the frame; and FIG. 8 is a partial elevational view showing a alternative form indicating that the joint angle may be varied.

DESCRIPTION OF PREFERRED EMBODIMENTS

Figure 2:
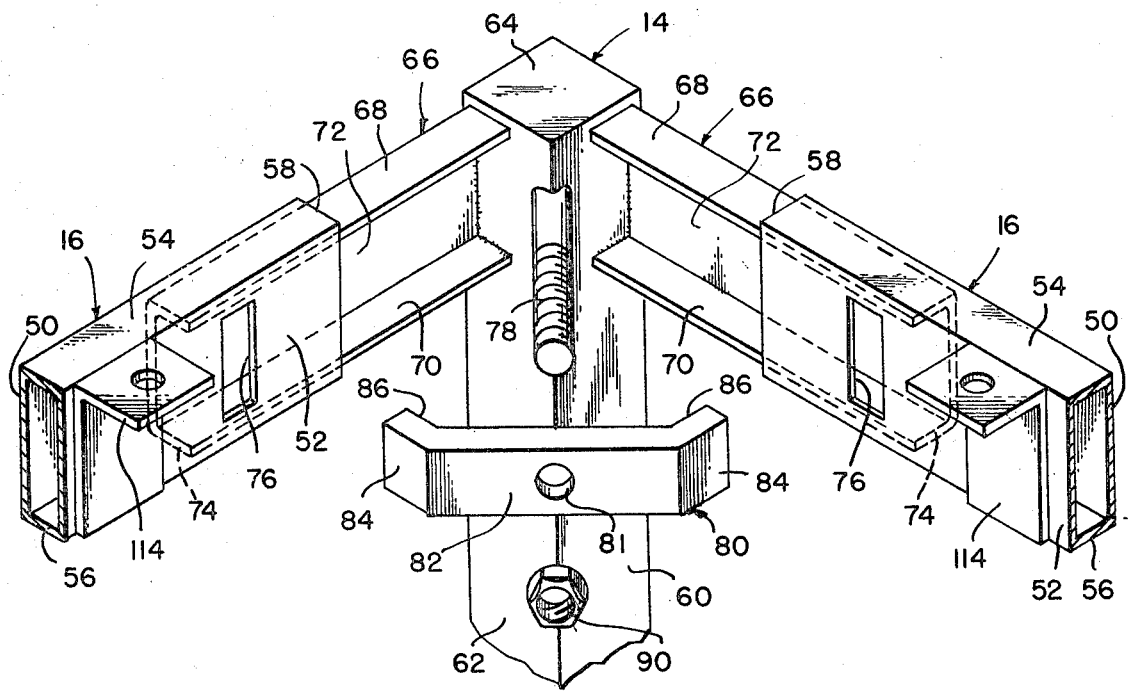
FIG. 2 is a partial perspective view showing the joint construction in greater detail and particularly with the parts in the unassembled state.

FIGS. 2 to 4 show the basic construction of this knockdown joint as applied to a table leg, for instance. Corner pieces or legs 14 are interconnected by box beam or rectangular tube apron or frame members 16. The frame members will have outer surface 50, inner surface 52, top surface 54, bottom surface 56, and end edges 58. Corner piece 14 has sides 60 and 62 and top 64. The two sides 60 and 62 for the purposes of this discussion will reference the two inner corner piece sides. Connected to and extending outwardly from each of the sides, 60 and 62, is a channel member defining an extension guide 66 for the frame members 16. Each extension guide 66 has upper flange 68, lower flange 70 and web 72. The extension guides 66 extend outwardly up to about four inches although this could be more or less if desired. The guides 66 have outer ends 74 and are preferably secured by welding to the leg at their inner ends. It will be noted that the extension guides are positioned so that frame members 16 are flush with the top 64 of the corner piece, although the frames may if desired also be spaced from the top. Inside surface 62 of each frame member will, at a predetermined distance form end 58, be provided with a rectangular opening 76 or other abutment means for purposes to be explained. The extension guides 66 while shown to be channel shaped may take any form. It is desirable and preferable that the tolerance permit a snug fit of the frame members on the extension guides.

Also mounted on the corner piece, either by welding or other reliable means, is bolt or threaded member 78. The extension guides 66 are at enough of an angle to each other to allow space for bolt 78 and project outwardly from sides 60 and 62 generally in the same plane. Bolt 78 is positioned approximately midway between the top and bottom of the plane of the extension guides 66 and approximately centered with respect to the angle therebetween. A retainer member or bracket, generally designated by the number 80, comprises an elongated piece of relatively heavy rectangular bar formed so that it has a center section 82, which will be disposed approximately normal to bolt 78, and angled end sections 84. End sections 84 will be disposed approximately at right angles to the extension guides and frame members so that the contact surfaces 86 of the retainer engage the edges of openings 76 or other abutment means. A hole 81 centrally disposed in the center section of retainer member 80 allows it to be received on bolt 78. A nut 90 locks retainer member 80 in position, as best seen in FIG. 3, to firmly and rigidly secure the frame ends 58 against the corner piece sides 60 and 62. Dimensional tolerances will be such that there is only sufficient tolerance between guides 66 and the inside surfaces of apron members 16 to permit them to be slipped together. Thus, when the retainer is locked in place there is no tendency for the joint to rattle or slip or for the component parts to move with respect to each other.

FIGS. 6 through 8 show slight modifications in the use and structure of the joint as disclosed in FIGS. 2 through 4. FIGS. 6 and 7 show a basic frame construction having corner piece 120 with frame members 16 engaging sides 122 and 124. A threaded member 78 is attached to corner piece 120 as described above. In this instance it will be noted that the corner piece instead of being square is L-shaped having an inside corner rather than an outside corner as in FIGS. 2 through 4. To illustrate the flexibility of the joint construction of this invention, it can be seen that mounting bracket members 126 are located on the inside surface 52 of frame members 16 at a desired point. A panel 128 may then be mounted on brackets 126 so as to have its exposed surface flush with frame members 16 and corner piece 120. It will be appreciated that an esthetically pleasing panel and frame structure may thus be constructed. It will also be appreciated that the mounting bracket shown are merely illustrative and that many types of clips, ties, screws or other means may be devised for attaching a panel or surface in flush relationship with the basic frame. FIG. 7 shows brackets 128 mounted on the inside surface 52 of frame members 16 so that a cover or panel 132 can be installed in such a way as to completely hide any frame structure. Again the manner of mounting the panel, cover, top, or surface 132 will be a matter of choice.

FIG. 8 shows a slightly modified form of the joint construction in which a corner piece generally designated by the number 136 takes on a more irregular shape because the angle is more than 90° between frame members 16. Accordingly, the corner piece 136 will have one frame engaging side 138 and another frame engaging side 140. Threaded member 78 will be mounted on the inner flat surface 142 of corner piece 136. It will be appreciated that the angle between frame members 16 may be less than 90° if desired in which case the shape of the corner piece will vary but still present frame engaging or abutting sides.

Figure 1:
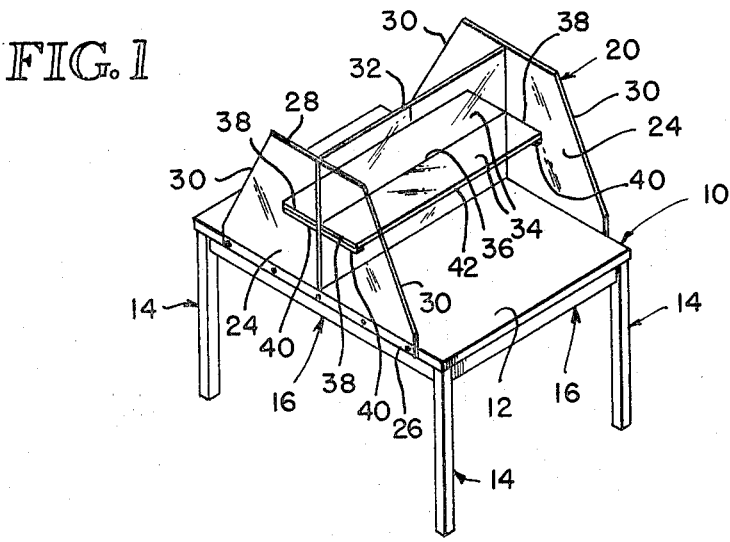
FIG. 1 is a perspective view showing a study carrel mounted on a table utilizing the novel knockdown joint construction.

The table of FIG. 1, generally designated by the number 10, has table surface or top 12 mounted on legs 14, which in turn are interconnected by apron or frame members 16. The study carrel, generally designated by the number 20, is a light transmitting material preferably translucent rather than transparent for eliminating shadows and gloom from the study area. The study carrel has side partitions 22 and 24, which are generally upstanding walls having a bottom edge 26 and a top edge 28. The top edge being shorter or of less dimension than the bottom edge requires the partition to have an angles edge 30. A center rectangular partition 32 divides the study carrel into two areas. The center wall or partition extends between side partitions 24 and, as can be seen, is the same height as the side partitions. A shelf 34 is provided in each compartment of the carrel and each shelf has a back edge 36 abutting the center partition 32 and end edges 38 abutting the side partitions. Included are support strips 40 at each end for strengthening the mounting of the shelves. The front edge 42 of the shelf is disposed approximately equal or even with the outer end of support mounts 40. This shelf will be approximately book depth. Since the carrel will be constructed of translucent material all of the study area defined in the two study compartments will be fully lighted and free of shadows.

FIG. 5 shows an alternative embodiment for study carrel construction. The FIG. illustrates that multiples of the single carrel structure shown in FIG. 1 may be made. Thus, the multiple carrel, generally designated by the number 100, has transverse partitions 102, center partitions 104, and shelves 106 supported on mounts 108 attached to side partitions 102. The middle transverse partition 102 is held in place on the tabletop with brackets or blocks 110 or other acceptable means. Preferably, all portions of the study carrel are of the same material, such as a translucent plastic. Esthetic aspects as well as functional values in the construction are thus preserved. The carrels, as can be seen in FIG. 4, may be mounted on the side edge of the table surface 12 by screws 112. To mount the table top 12 to the assembled legs and frame members, it is only necessary to provide attachment means such as brackets 114 on the inside surfaces 52 of aprons 16 and screws 116.

We claim:

1. A knockdown joint construction for furniture, frames, and the like, comprising:
   a. a corner piece having a pair of mounting surfaces;
   b. an outwardly extending guide means securely mounted on each side surface such that an angle of less than 180° is defined between said guide means;
   c. a tubular frame member received on each said guide means in abutting relationship to the mounting surface, each of said tubular frame members having retainer engaging means thereon; and
   d. securing means anchored to said corner piece within the angle defined by said guide means and extending outwardly therefrom, and
   e. retainer means received on said securing means for engaging said retainer engaging means on said tubular frame members and including retainer tightening means for holding said retainer means, frame members, corner piece and guide means rigidly together.

2. The knockdown joint construction of claim 1 and wherein said mounting surfaces are generally flat and wherein each guide means is mounted thereon generally normal thereto.

3. The joint construction according to claim 2 and wherein said guide means is a channel shaped member having an open side which faces said securing means.

4. The joint construction according to claim 3 and wherein said frame member is a generally rectangularly shaped tube the inside dimensions of which are substantially the same as the outside dimensions of said channel shaped guide means so that close fitting clearance tolerances are maintained between guide means and frame members.

5. The joint construction of claim 4 and wherein said securing means is a threaded member and is located generally equidistant from each of said guide means.

6. The joint construction according to claim 5 and wherein said retainer means is a bar member with angled end portions for engaging said retainer engaging means at approximately a right angle to its respective frame member.

7. The joint construction according to claim 6 and wherein said frame members include means for mounting a surface structure thereon.

8. The joint construction of claim 7 and wherein said retainer engaging means comprises an opening in each of said frame members which presents an edge surface engaged by said retainer means.

9. A knockdown joint joint construction for furniture, frames and the like, comprising:
   a. a corner piece having a pair of side mounting surfaces;
   b. an outwardly extending guide means securely mounted on each side surface such that each guide means is generally normal to its mounting surface and such that an angle of less than 180° is defined between said guide means;
   c. a tubular frame member received on each said guide means in coacting abutting relationship to the mounting surface, each of said tubular frame members having retainer engaging means thereon;
   d. securing means anchored to aid corner piece within the angle defined by said guide means and extending outwardly therefrom generally equidistant from each said guide means; and
   e. retainer means received on said securing means for engaging said retainer engaging means on said tubular frame members and including retainer tightening means for holding said retainer means, frame members, corner piece and guide means rigidly together.

10. The joint construction according to claim 9 and wherein said guide means is a channel shaped member having an open side which faces said securing means.

11. The joint construction according to claim 10 and wherein said frame member is a generally rectangularly shaped tube the inside dimensions of which are substantially the same as the outside dimensions of said channel shaped guide means so that close fitting clearance tolerance are maintained between guide means and frame members.

12. The joint construction of claim 11 and wherein said securing means is a threaded member and is located generally equidistant from each of said guide means.

13. The joint construction according to claim 12 and wherein said retainer means is a bar member with angled end portions for engaging said retainer engaging means at approximately a right angle to its respective frame member.

14. The joint construction according to claim 13 and wherein said frame members include means for mounting a surface structure thereon.

15. The joint construction of claim 14 and wherein said retainer engaging means comprises an opening in each of said frame members which presents an edge surface engaged by said retainer means.